United States Patent
Ferris et al.

(10) Patent No.: US 7,852,588 B1
(45) Date of Patent: Dec. 14, 2010

(54) DISK DRIVE ADJUSTING GAIN OF SHOCK DETECTOR RELATIVE TO RESONANT FREQUENCY AMPLITUDE

(75) Inventors: Timothy A. Ferris, Mission Viejo, CA (US); Robert P. Ryan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 221 days.

(21) Appl. No.: 12/144,015

(22) Filed: Jun. 23, 2008

(51) Int. Cl.
*G11B 19/04* (2006.01)
(52) U.S. Cl. .......................... 360/60; 360/75
(58) Field of Classification Search ....................... None
See application file for complete search history.

(56) References Cited

U.S. PATENT DOCUMENTS

| | | | |
|---|---|---|---|
| 5,299,075 A | 3/1994 | Hanks | |
| 5,663,847 A | 9/1997 | Abramovitch | 360/75 |
| 6,295,507 B1 * | 9/2001 | Sasamoto et al. | 360/77.03 |
| 6,414,813 B2 | 7/2002 | Cvancara | |
| 6,721,122 B2 * | 4/2004 | Aikawa et al. | 360/77.02 |
| 6,914,743 B1 | 7/2005 | Narayana et al. | |
| 6,952,318 B1 | 10/2005 | Ngo | |
| 7,177,113 B1 * | 2/2007 | Semba et al. | 360/77.07 |
| 7,468,857 B2 * | 12/2008 | Hutsell et al. | 360/77.03 |
| 7,471,483 B1 * | 12/2008 | Ferris et al. | 360/75 |
| 7,480,112 B2 * | 1/2009 | Tanner | 360/69 |
| 7,580,217 B2 * | 8/2009 | Abe et al. | 360/75 |
| 7,661,291 B2 * | 2/2010 | McMahan et al. | 73/1.38 |
| 7,706,099 B2 * | 4/2010 | Uchida et al. | 360/75 |
| 2007/0241711 A1 * | 10/2007 | Finamore et al. | 318/561 |
| 2008/0278841 A1 * | 11/2008 | McKenzie et al. | 360/73.03 |
| 2008/0285170 A1 * | 11/2008 | Uchida et al. | 360/77.02 |

\* cited by examiner

*Primary Examiner*—Wayne R Young
*Assistant Examiner*—James L Habermehl

(57) ABSTRACT

A disk drive is disclosed comprising a disk, a head actuated radially over the disk, and control circuitry including a shock detector. The control circuitry is operable to detect a resonant frequency amplitude (RFA) of the shock detector, adjust the shock detector in response to the RFA, and take protective action in response to the shock detector.

22 Claims, 5 Drawing Sheets

DISK DRIVE ADJUSTING GAIN OF SHOCK DETECTOR RELATIVE TO RESONANT FREQUENCY AMPLITUDE

BACKGROUND

Description of the Related Art

A disk drive comprises a disk rotated by a spindle motor, and a head connected to a distal end of an actuator arm which is rotated about a pivot by a voice coil motor (VCM) to position the head radially over the disk. The disk comprises a number of concentric data tracks each partitioned into a number of data sectors. Access operations are performed by seeking the head to a target data track, and performing a write/read operation on the data sectors within the data track. The disk comprises embedded servo sectors having position information recorded therein, such as coarse position information (e.g., a track address) and fine position information (e.g., servo bursts). Control circuitry processes the read signal emanating from the head in order to demodulate the servo sectors into a control signal applied to the VCM in order to position the head over the target data track.

Physical shocks to the disk drive may cause the head to deviate from the target track and corrupt data recorded in an adjacent track during a write operation. Therefore, if a physical shock is detected using a suitable sensor (e.g., an accelerometer), the write operation is typically aborted and then retried. However, the shock sensor typically exhibits a resonant frequency which can trigger a false shock detection, thereby degrading the performance of the disk drive due to the unnecessary slipped disk revolutions.

DETAILED DESCRIPTION OF EMBODIMENTS OF THE INVENTION

Figure 1A:
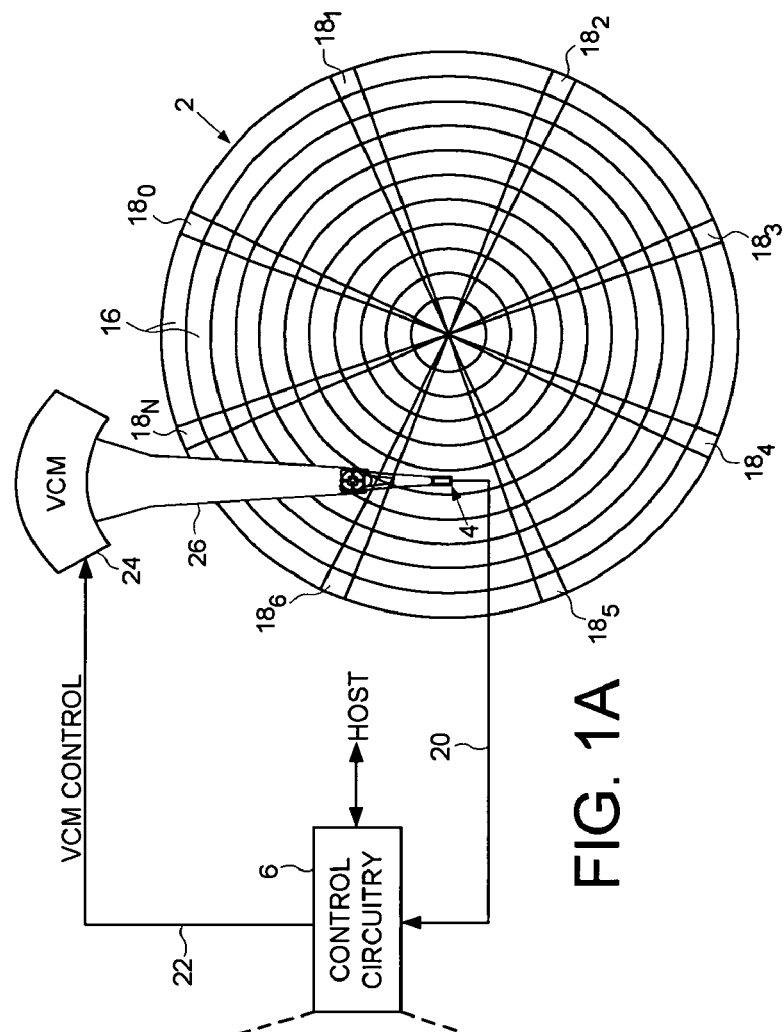
FIG. 1A shows a disk drive according to an embodiment of the present invention comprising a disk, a head actuated over the disk, and control circuitry including a shock detector.
Figure 1B:
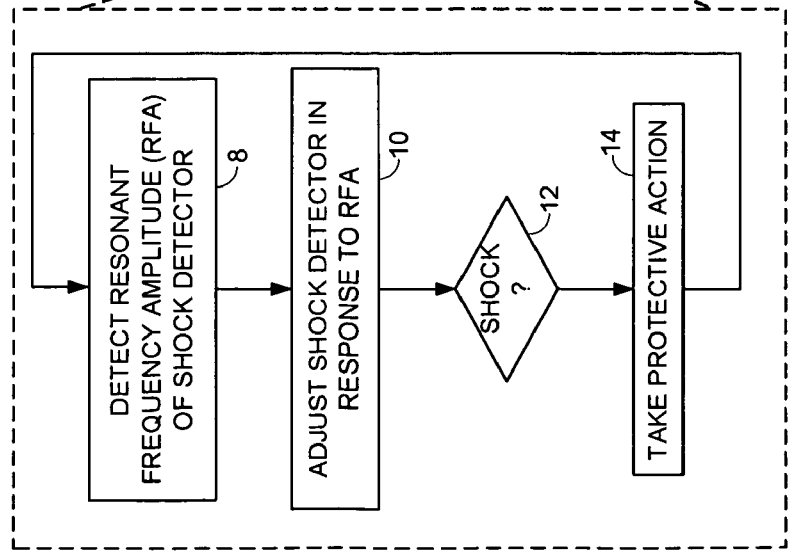
FIG. 1B is a flow diagram executed by the control circuitry for adjusting the shock detector in response to a resonant frequency amplitude (RFA) of the shock detector.

FIG. 1A shows a disk drive according to an embodiment of the present invention comprising a disk 2, a head 4 actuated radially over the disk 2, and control circuitry 6 including a shock detector. The control circuitry 6 executes the flow diagram of FIG. 1B in order to adjust the shock detector by detecting a resonant frequency amplitude (RFA) of the shock detector (step 8), adjusting the shock detector in response to the RFA (step 10), and taking protective action (step 14) when a shock event is detected (step 12).

In the embodiment of FIG. 1A, the disk 2 comprises a plurality of data tracks 16 defined by a plurality of embedded servo sectors $18_0$-$18_N$. The control circuitry 6 processes a read signal 20 emanating from the head 4 in order to demodulate the position information recorded in the embedded servo sectors $18_0$-$18_N$ (e.g., a servo track address and servo bursts). The control circuitry 6 generates a position error signal (PES) representing a position error between a current location of the head and a target location of the head. The control circuitry 6 filters the PES using a suitable compensation filter to generate a VCM control signal 22 applied to a voice coil motor (VCM) 24 which rotates an actuator arm 26 about a pivot in order to move the head 4 in a direction that reduces the PES.

During a write operation to a target data track, a physical shock to the disk drive may cause the head 4 to deviate from the target track and corrupt data recorded in an adjacent track. Therefore, the control circuitry 6 comprises a shock detector for detecting shock events in order to abort write operations to prevent corrupting data recorded in adjacent tracks.

Figure 2A:
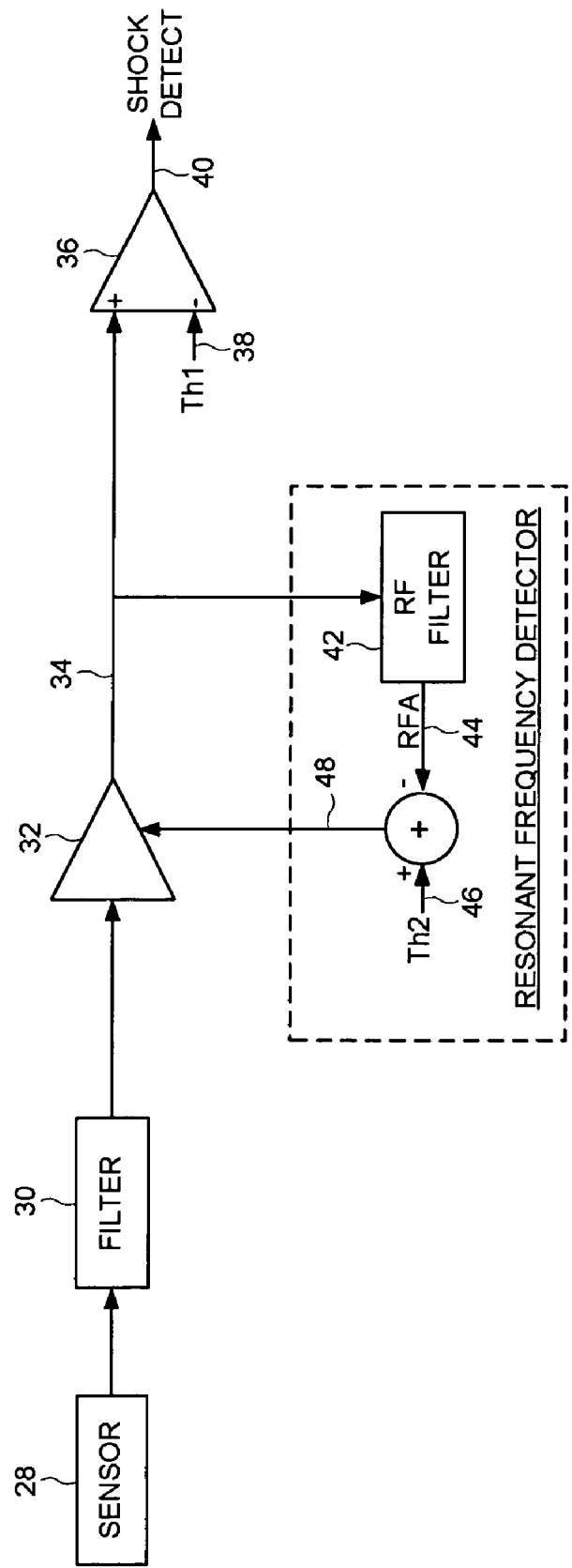
FIG. 2A shows control circuitry according to an embodiment of the present invention including a resonant frequency filter for detecting the RFA which is compared to a RFA threshold to generate a control signal for adjusting the gain of a shock detector amplifier.

FIG. 2A shows control circuitry according to an embodiment of the present invention including circuitry for implementing the shock detector. The shock detector comprises a suitable sensor 28 (e.g., an accelerometer), a suitable filter 30 for filtering the output of the sensor 28, an amplifier 32 for amplifying the output of the filter 30 to generate a shock signal 34, and a comparator 36 for comparing the shock signal 34 to a shock threshold 38. A shock event is detected 40 when the shock signal 34 exceeds the shock threshold 38.

Since a resonant frequency of the shock detector may result in the detection of false shock events, the control circuitry of FIG. 2A comprises a resonant frequency detector including a resonant frequency (RF) filter 42 for detecting a resonant frequency amplitude (RFA) 44 of the shock detector. The RFA 44 is compared to a RFA threshold 46, and the difference 48 is used to adjust a gain of amplifier 32. This embodiment effectively implements a gain control algorithm for adjusting the gain of the shock detector so as to maintain a constant RFA, thereby reducing the number of false shock events due to the RFA.

The RF filter 42 may detect any suitable RFA due to any suitable characteristic of the disk drive. In one embodiment, the extracted RFA corresponds to at least one of a frequency response of the sensor 28, a frequency response of a circuit board of the disk drive, and a frequency response of a mechanical structure of the disk drive, such as a frequency response of a spindle motor for rotating the disk 2 or a frequency response of the VCM 24. In one embodiment, a number of disk drives are evaluated during a manufacturing process in order to identify a nominal target frequency range for the RF filter 42. In another embodiment, the frequency range for the RF filter 42 may be calibrated for each individual disk drive, for example, by adjusting the frequency range of the RF filter 42 until the number of false shock events is minimized. The RF filter 42 may comprise any suitable circuitry, and in one embodiment, the RF filter comprises a bandpass filter for extracting an amplitude of a target frequency range of the shock signal 34. In addition, the RF filter 42 may be implemented in continuous time, or discrete time by sampling the shock signal 34 and processing the sample values using digital circuitry.

Figure 2B:
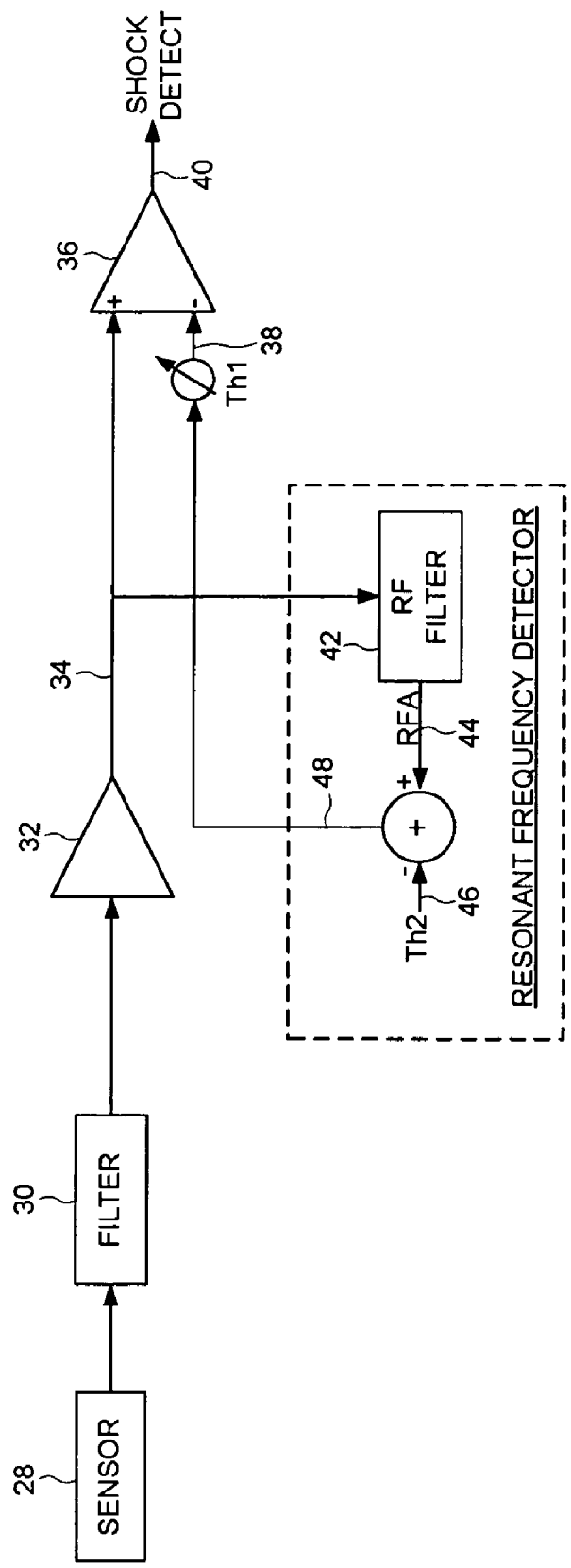
FIG. 2B shows control circuitry according to an embodiment of the present invention wherein the control signal adjusts a threshold of a shock detector comparator.

The shock detector may be adjusted in any suitable manner in response to the detected RFA. In an embodiment illustrated in FIG. 2B, the difference 48 between the RFA 44 and the RFA threshold 46 is used to adjust the shock threshold 38 of the shock detector. Similar to the embodiment disclosed in FIG. 2A, the embodiment of FIG. 2B attempts to maintain the RFA sensitivity of the shock detector constant in order to reduce the number of false shock events due to the RFA.

Figure 3:
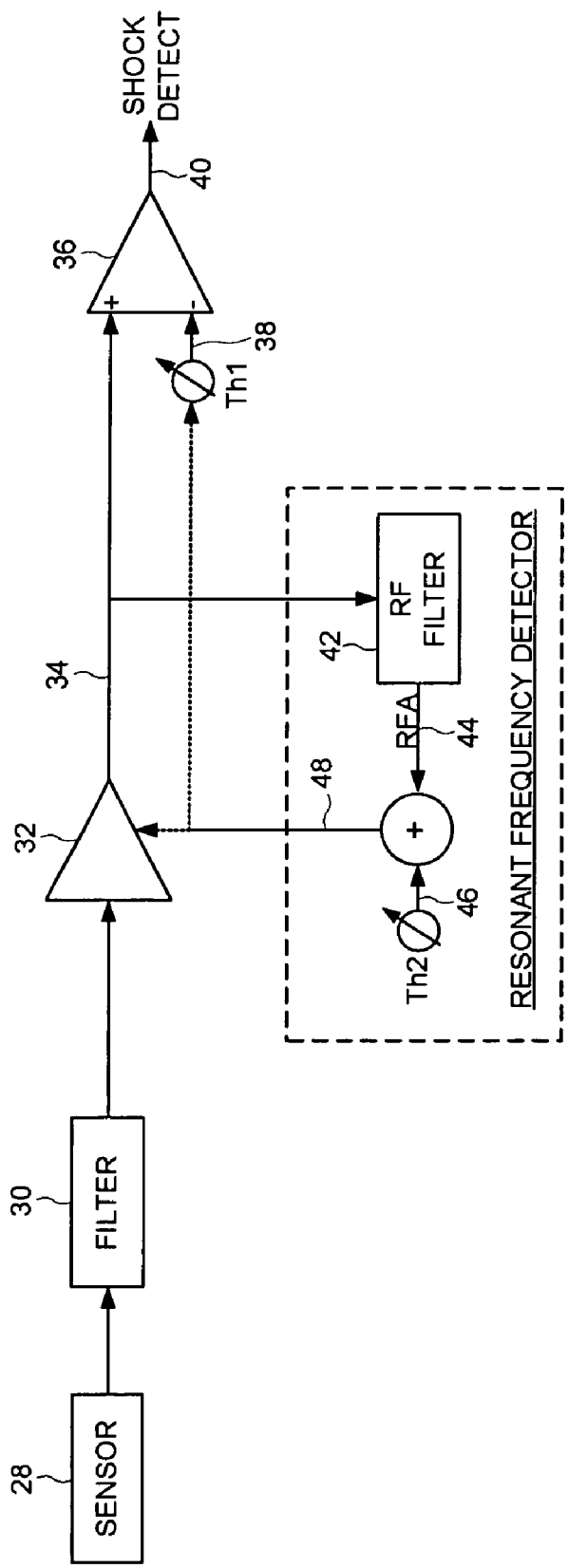
FIG. 3 shows an embodiment of the present invention wherein the RFA threshold is adjusted relative to a frequency of the detected shock events.

FIG. 3 shows an embodiment of the present invention wherein the RFA threshold 46 is adjustable. In one embodiment, the control circuitry 6 decreases the RFA threshold 46 when the shock signal 34 exceeds the shock threshold 38. In another embodiment, the control circuitry 6 decreases the RFA threshold 46 when the shock signal 34 exceeds the shock threshold 38 at a predetermined frequency, and in another embodiment, the control circuitry 6 increases the RFA threshold 46 when the shock signal 34 remains below the shock threshold 38 for a predetermined interval. In the embodiment of FIG. 3, the gain of amplifier 32 may be adjusted in response to the difference 48, or the shock threshold 38 may be adjusted in response to the difference 48, or both may be adjusted in response to the difference 48.

Figure 4:
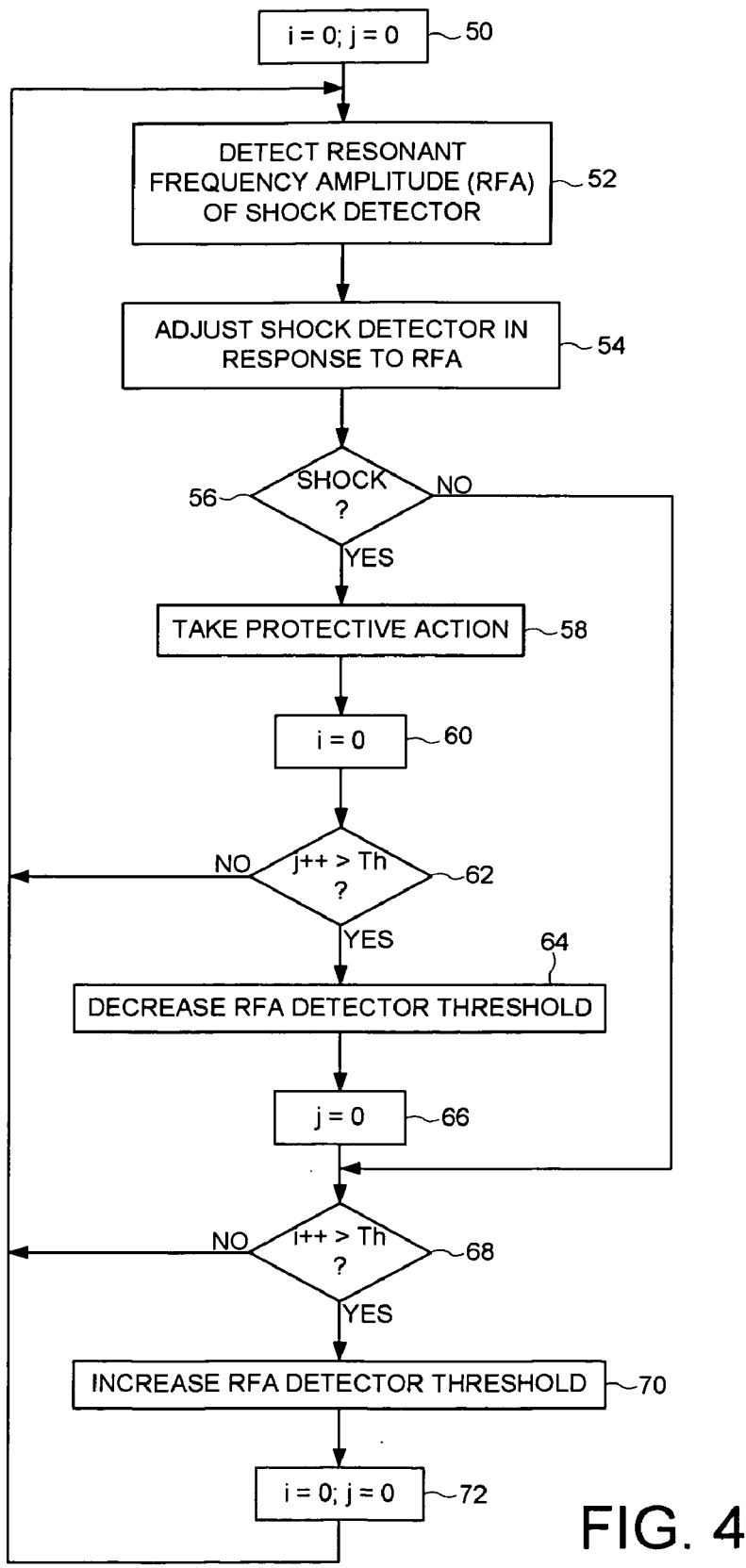
FIG. 4 is a flow diagram according to an embodiment of the present invention for adjusting the RFA threshold relative to a frequency of the detected shock events.

FIG. 4 is a flow diagram according to an embodiment of the present invention for adjusting the RFA threshold 46 relative to a frequency of the detected shock events. Two counters (i,j) are initialized to zero (step 50), wherein the counter i tracks an interval that no shock events are detected, and counter j tracks a frequency that shock events are detected. The RFA of the shock detector is detected (step 52) and the shock detector is adjusted in response to the RFA (step 54). When a shock event is detected (step 56), the control circuitry takes protective action (step 58), such as aborting a current write operation, and resets the i counter (step 60). The control circuitry increments the j counter, and if the j counter exceeds a threshold (step 62), the control circuitry decreases the RFA threshold 46 so as to decrease the sensitivity of the shock detector to the RFA. The control circuitry also resets the j counter (step 66) in order to reset the frequency detection of the shock events. If the i counter exceeds a threshold (step 68), indicating that a shock event has not been detected for a predetermined interval, the control circuitry increases the RFA threshold 46 (step 70) in order to increase the sensitivity of the shock detector to the RFA. The control circuitry also resets both the i and j counters in order to reset the window for adjusting the RFA threshold 46.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated radially over the disk; and
   control circuitry including a shock detector, the control circuitry operable to:
      detect a resonant frequency amplitude (RFA) of the shock detector;
      adjust a gain of the shock detector in response to the RFA; and
      take protective action in response to the shock detector.

2. The disk drive as recited in claim 1, wherein the shock detector comprises an accelerometer.

3. The disk drive as recited in claim 2, wherein the RFA is affected by a characteristic of at least one of the accelerometer, a circuit board of the disk drive, and a mechanical structure of the disk drive.

4. The disk drive as recited in claim 1, wherein the control circuitry adjusts the gain of the shock detector by adjusting a threshold of the shock detector in response to the RFA.

5. The disk drive as recited in claim 1, wherein the shock detector comprises:
   a sensor operable to output a shock signal;
   an amplifier operable to amplify the shock signal; and
   a threshold detector for comparing the amplified shock signal to a shock threshold;
   wherein the control circuitry adjusts the gain of the shock detector by adjusting a gain of the amplifier in response to the RFA.

6. The disk drive as recited in claim 1, wherein the shock detector comprises:
   a sensor operable to output a shock signal;
   an amplifier operable to amplify the shock signal; and
   a threshold detector for comparing the amplified shock signal to a shock threshold;
   wherein the control circuitry adjusts the gain of the shock detector by adjusting the threshold of the threshold detector in response to the RFA.

7. The disk drive as recited in claim 1, wherein the control circuitry comprises:
   a filter for extracting the RFA; and
   a comparator for comparing the RFA to a RFA threshold.

8. The disk drive as recited in claim 7, wherein the RFA threshold is adjustable.

9. The disk drive as recited in claim 8, wherein the control circuitry is further operable to decrease the RFA threshold when the shock signal exceeds the shock threshold.

10. The disk drive as recited in claim 9, wherein the control circuitry is further operable to decrease the RFA threshold when the shock signal exceeds the shock threshold at a predetermined frequency.

11. The disk drive as recited in claim 8, wherein the control circuitry is further operable to increase the RFA threshold when the shock signal remains below the shock threshold for a predetermined interval.

12. A method of operating a disk drive, the disk drive comprising a disk, a head actuated radially over the disk, and control circuitry including a shock detector, the method comprising:
   detecting a resonant frequency amplitude (RFA) of the shock detector;
   adjusting a gain of the shock detector in response to the RFA; and
   taking protective action in response to the shock detector.

13. The method as recited in claim 12, wherein the shock detector comprises an accelerometer.

14. The method as recited in claim 13, wherein the RFA is affected by a characteristic of at least one of the accelerometer, a circuit board of the disk drive, and a mechanical structure of the disk drive.

15. The method as recited in claim 12, further comprising adjusting the gain of the shock detector by adjusting a threshold of the shock detector in response to the RFA.

16. The method as recited in claim 12, wherein the shock detector comprises:
   a sensor operable to output a shock signal;
   an amplifier operable to amplify the shock signal; and
   a threshold detector for comparing the amplified shock signal to a shock threshold;
   further comprising adjusting the gain of the shock detector by adjusting a gain of the amplifier in response to the RFA.

17. The method as recited in claim 12, wherein the shock detector comprises:
   a sensor operable to output a shock signal;
   an amplifier operable to amplify the shock signal; and
   a threshold detector for comparing the amplified shock signal to a shock threshold;
   further comprising adjusting the gain of the shock detector by adjusting the threshold of the threshold detector in response to the RFA.

18. The method as recited in claim 12, further comprising:
   extracting the RFA; and
   comparing the RFA to an RFA threshold.

19. The method as recited in claim 18, further comprising adjusting the RFA threshold.

20. The method as recited in claim 19, further comprising decreasing the RFA threshold when the shock signal exceeds the shock threshold.

21. The method as recited in claim 20, further comprising decreasing the RFA threshold when the shock signal exceeds the shock threshold at a predetermined frequency.

22. The method as recited in claim 19, further comprising increasing the RFA threshold when the shock signal remains below the shock threshold for a predetermined interval.

* * * * *